Oct. 25, 1955
T. J. KEARNEY
2,721,564
SPRAY TYPE WASHING APPARATUS
Filed June 23, 1953
5 Sheets-Sheet 1
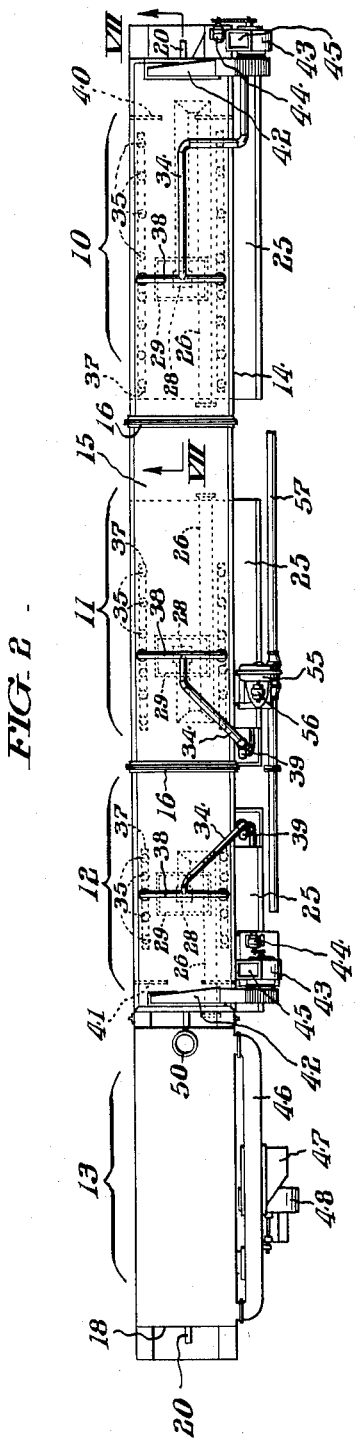
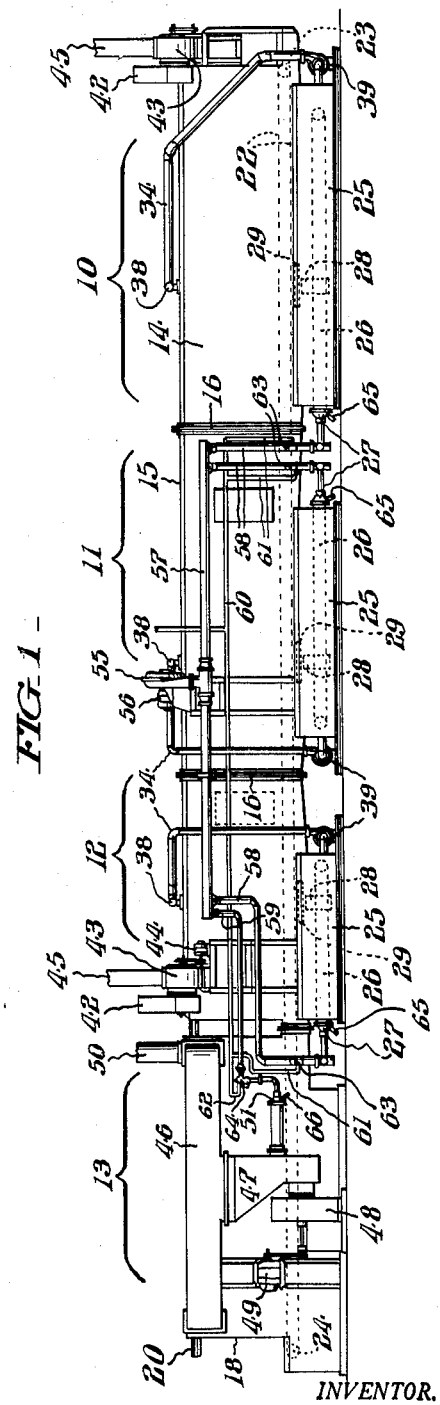
INVENTOR.
Thomas J. Kearney,
BY Paul & Paul
ATTORNEYS.

Oct. 25, 1955  T. J. KEARNEY  2,721,564
SPRAY TYPE WASHING APPARATUS
Filed June 23, 1953  5 Sheets-Sheet 2

INVENTOR.
Thomas J. Kearney,
BY Paul & Paul
ATTORNEYS.

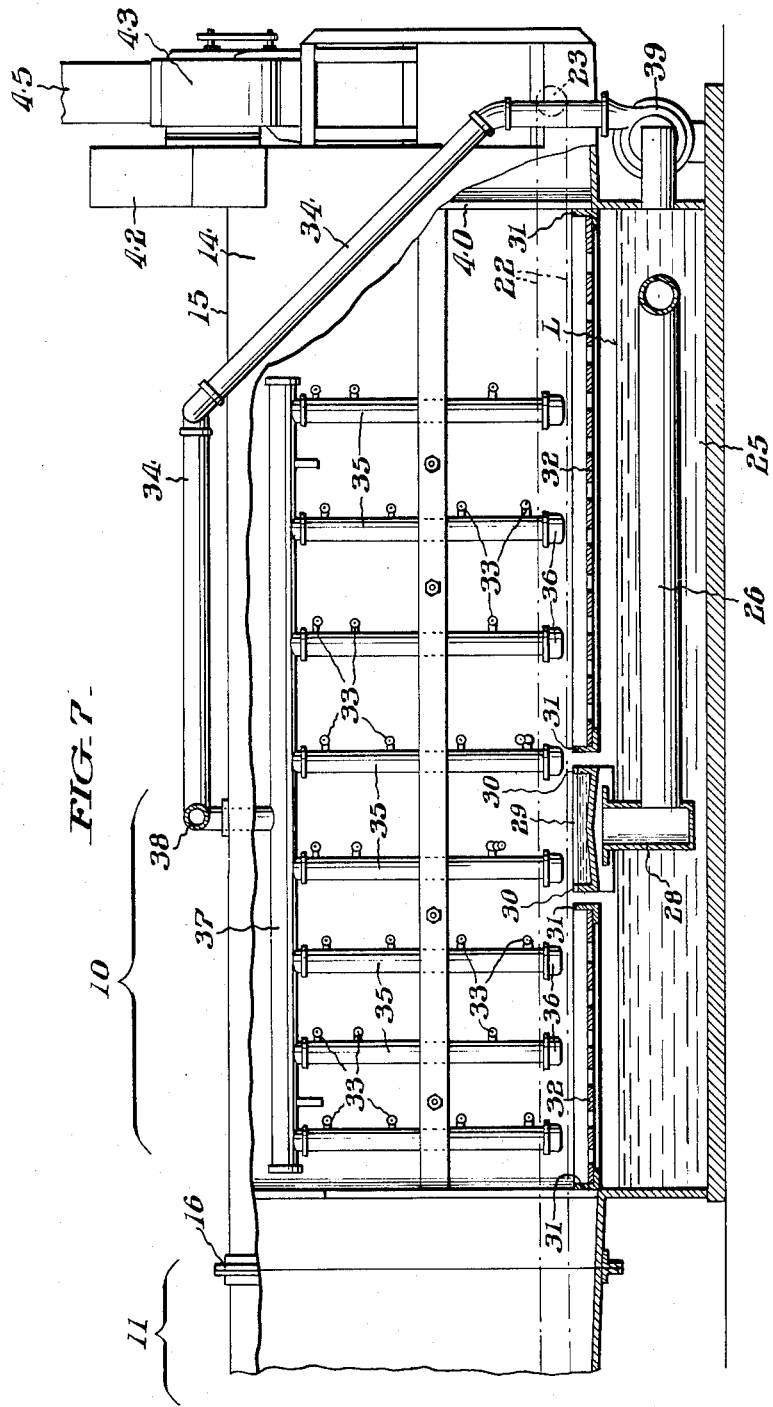

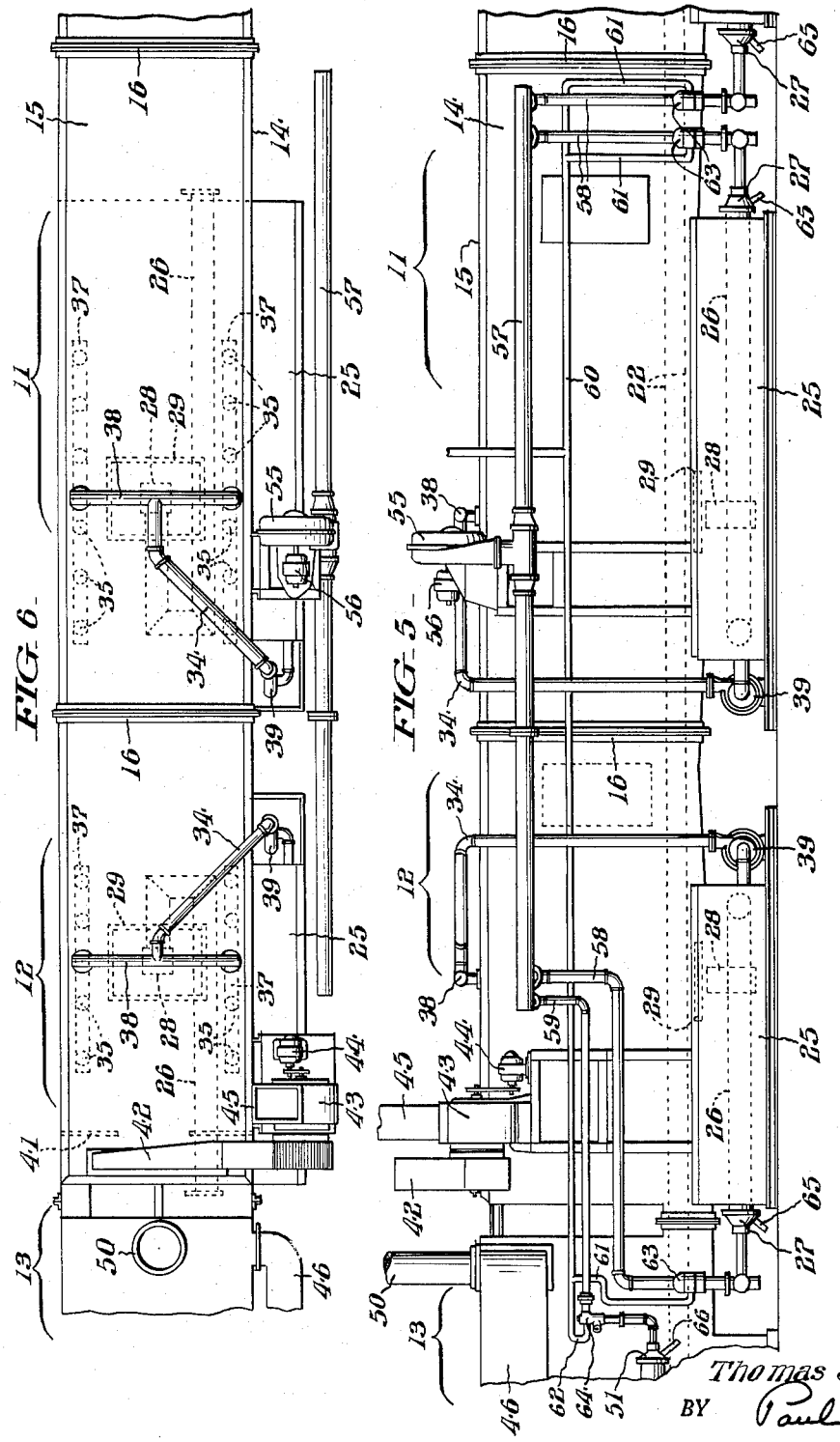

Oct. 25, 1955  T. J. KEARNEY  2,721,564
SPRAY TYPE WASHING APPARATUS

Filed June 23, 1953  5 Sheets—Sheet 5

INVENTOR.
Thomas J. Kearney,
BY Paul & Paul
ATTORNEYS.

United States Patent Office 2,721,564
Patented Oct. 25, 1955

2,721,564

SPRAY TYPE WASHING APPARATUS

Thomas J. Kearney, Detroit, Mich., assignor to Detrex Corporation, Detroit, Mich., a corporation of Michigan Application June 23, 1953, Serial No. 363,481

11 Claims. (Cl. 134—72)

This invention relates to spray type washing apparatus. More particularly, it is concerning with gas fired apparatus useful in hot spraying conversion coatings such as iron and zinc phosphate coatings.

The chief aim of my invention is to provide an apparatus of the kind referred to in which the washing is accomplished upon work continuously conveyed through it; which is simple in construction and operation; and which is highly efficient both as regards consumption of the wash liquid and consumption of the fuel used in heating the liquid.

How the foregoing and other important advantages are realized in practice will appear from the following detailed description of the attached drawings wherein:

Fig. 1 shows in side elevation an improved washing apparatus embodying my invention.

Fig. 2 shows the apparatus in top plan.

Figure 3:
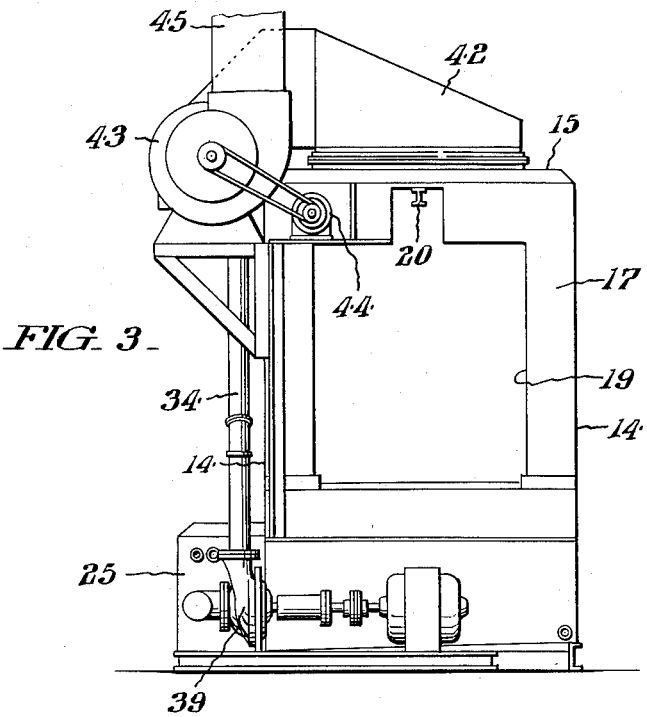
Figure 4:
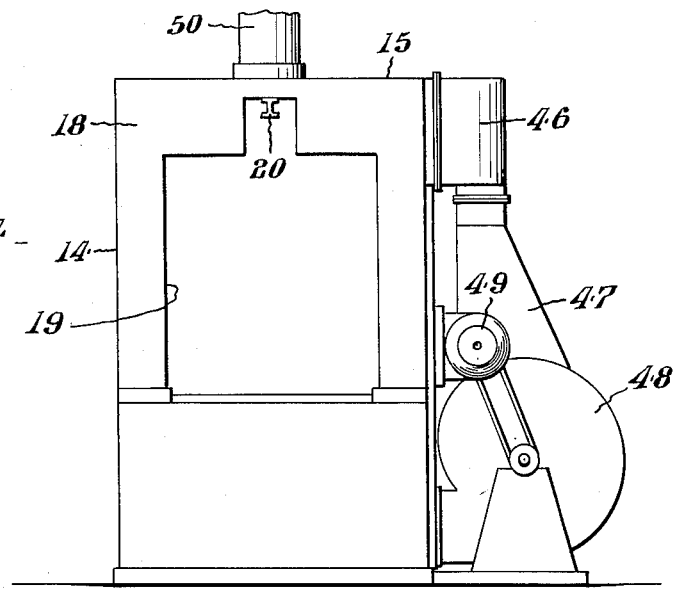

Figs. 3 and 4 respectively show the right and left end elevations of the apparatus.

Figs. 5 and 6, are fragmentary views corresponding to Figs. 1 and 2 and respectively showing in side elevation and in top plan, the mid portion of the apparatus on a larger scale.

Fig. 7 is a fragmentary view partly in longitudinal section taken as indicated by the angled arrows VII—VII in Fig. 2.

Figure 8:
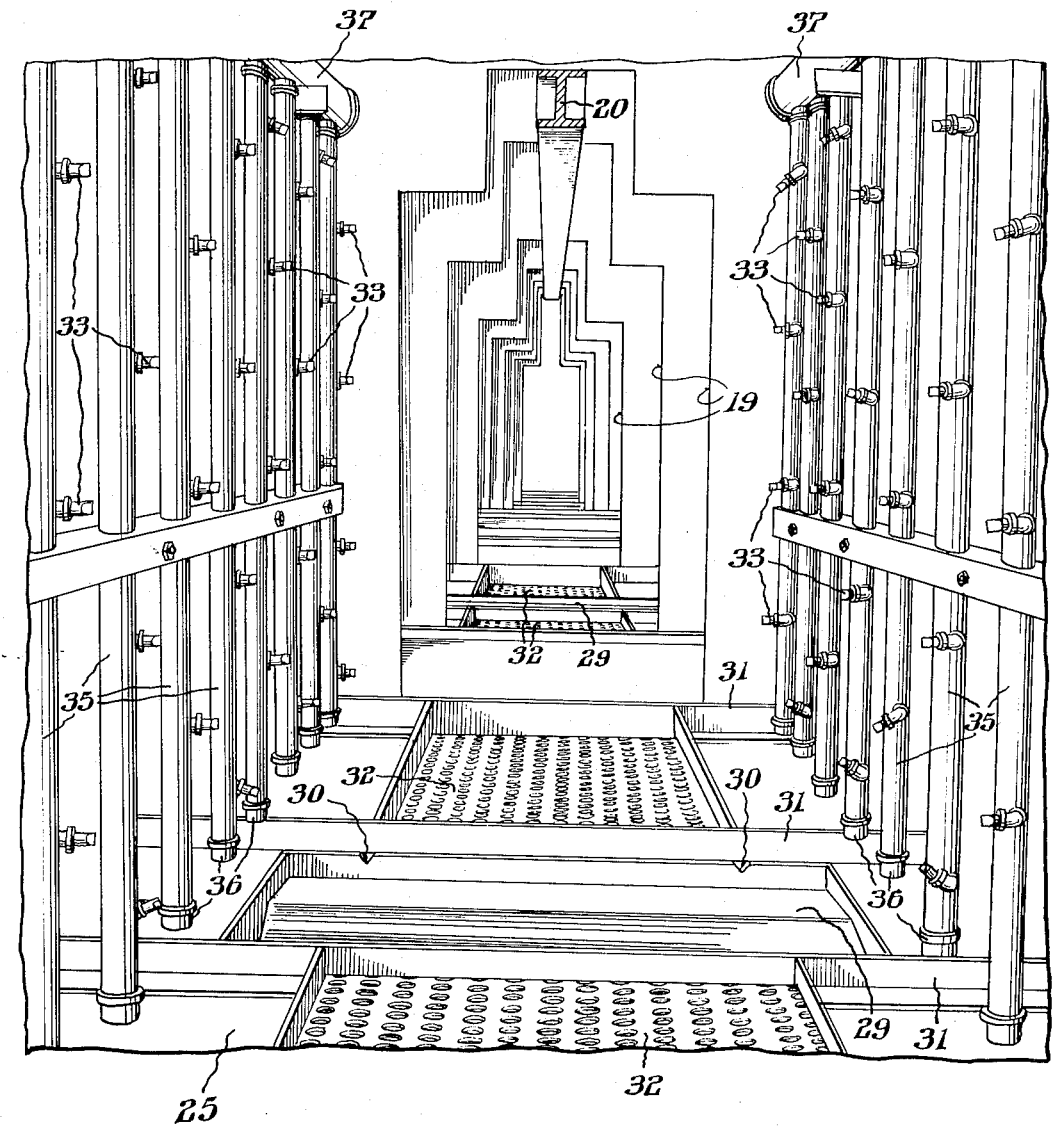

Fig. 8 is a fragmentary view in perspective looking through the apparatus from the right hand or entrant end toward the left hand or exit end.

As herein exemplified, our improved washing apparatus comprises an elongate tunnel housing through which the work to be processed is passed longitudinally from right to left in Figs. 1 and 2, said housing being composed in this instance of four aligned sections 10, 11, 12 and 13. Except for being consecutively shorter as to length, the sections 10, 11 and 12, except as hereinafter pointed out, are identical in construction and in their appointments. The side walls 14 and roofs 15 of the several sections are preferably of sheet metal and secured to a skeleton frame of structural iron, the mutually confronting ends of the sections 10, 11 and 12 being flange connected as at 16. The remote end walls 17 and 18 of the housing (see Figs. 3 and 4) are centrally cut out as at 19, i. e., extend partway inward from the sides 14 and partway downward from the roofs 15 to clear work suspension trolleys or slides (not shown) guided for travel along a track 20 extending throughout the length of the housing at the top. Also extending through the housing is an endless belt conveyer 22 for loose work which is trained about end sprockets 23 and 24, and power driven by suitable means, not illustrated.

At the bottom of each of the sections 10, 11 and 12 is a sump 25 for washing liquid which is maintained at the level L. Submerged in the liquid in each sump 25 is a longitudinally arranged heating coil 26 which is fired by a gas burner 27 accessible at the exterior of the structure. Each heating coil 26 terminates in a short upright stack 28 centrally of the corresponding section of the housing, and overlying said stack is a baffle in the form of a transversely arranged trough 29 whereof the opposite ends are supported by the skeleton frame, the side walls of said trough being V notched as at 30 as best shown in Figs. 7 and 8. Bridged between crosswise angle beams 31 respectively adjacent opposite sides of trough 29 and at opposite ends of the section are pans 32 whereof the bottoms are perforated. As the work is passed through the apparatus, it is sprayed with wash liquid discharged from nozzles 33 (Figs. 7 and 8) at different elevations in multiple vertical pipes 35 respectively arranged in spaced relation along opposite sides of the section. As shown, the pipes 35 are individually capped at their bottom ends as at 36, and at their tops are connected to headers 37 which, in turn, are connected centrally to a transverse pipe 38 above the roof of the section. During operation of the apparatus, the wash liquid is continuously drawn from the sump 25 of each section 10—12 by a motor driven rotary pump 39 and delivered, through conduiting 34, to the transverse pipe 38.

The gaseous products of combustion are withdrawn from the tops of vestibules set apart by partitions 40 and 41 at the remote ends of sections 10 and 12 through trunks 42, by the action of rotary suction blowers 43 which are belt driven from separate electric motors 44 and which discharge into separate flues 45.

As the work is passed through section 13, the adhering wash liquid is evaporated by heated air circulated transversely within said section. The drying air is forced into the top of section 13 adjacent opposite ends through a header 46 which, by means of a trunk 47, is connected to the rotary pressure blower 48 driven by an electric motor 49. As shown, the saturated air is exhausted from the top of said section by way of a stack at 50, and the drying air is heated by a separate gas fired burner 51.

Combustion supporting air for operation of the several burners is delivered under pressure by a blower 55 positioned at the front of section 11 and driven from a separate electric motor 56. As shown, the discharge outlet of blower 55 is connected to a horizontal header 57 from which drop pipes 58 and 59 lead to the burners 27 and 51 respectively. The gas used in firing is supplied through a horizontal main 60 from which branches 61 and 62 extend to inspirator mixers 63 and 64 respectively interposed in the air pipes 58 and 59 adjacent the burners 27 and 51. Electric spark plugs 65 and 66 are associated with the burners 27 and 51 for ignition purposes at starting.

It is to be noted that, except for omissions in the vestibules at the entrant end of section 10, the vertical spray pipes 35 are arranged throughout said section along opposite sides. This arrangement is also true of the section 11 except for a void at the entrant end of the latter and the use of a lesser number of the vertical spray pipes 35. In section 12 there are voids at opposite ends and the vertical spray pipes 35 are grouped in the central region of said section, there being less of them here than in the section 11. The purpose of this construction and arrangement will become apparent from the description which immediately ensues of the operation of the apparatus.

Operation

The work to be cleaned is loaded upon the trolleys (not shown) or upon the conveyer 22 at the right hand end of the apparatus, travelled through the housing and removed after the treatment at the left hand end of the apparatus. In its traverse through section 10, the work is subjected to the washing action of the liquid forcibly discharged from the nozzles at opposite sides of said section. As the gaseous products of combustion issue from the stack 28 of the heating tube 26 in the sump 25 at the bottom of section 10, they are diffused laterally by the baffling action of the trough 29 to co-mingle with the wash spray by which heat is absorbed from them and which their temperature reduced below that of the liquid in said sump. As the gaseous products of combustion rise within section 10, they are drawn off through the trunks 42 by the suction blowers 43 and exhausted through the stacks 45 at opposite ends of the washer proper which comprises the sections 10, 11 and 12. In traversing the initial void portion of the section 11, most of the adhering liquid is permitted to drain from the work. However, before leaving section 11, the work is subjected to the rinse spray from the pipe nozzles 33 in said section, wherein the combustion gases discharged from the terminal stack 28 of the heating coil 26 in the corresponding sump are diffused by the baffle pan 29 to mingle with the spray liquid as in section 10. Incident to conveyance of the work into the initial void end of section 12, the excess liquid applied in section 11 is permitted to drain, and in being advanced through the central portion of section 12, the work is again rinsed by spray from the pipe nozzles in said section. As the work passes through the remaining portion of section 12, the excess of the rinse liquid last applied is permitted to drain into the sump at the bottom of said section. Here again, the temperature of the combustion products discharged from the terminal stack 28 of the heating coil 26 in the section 12 is reduced by contact with the spray before discharge into the stack 45 by the suction blower 43 at the last referred to end of said section. Finally as the work is traversed through the section 13, the remaining adherent rinse liquid is removed therefrom by the evaporating action of the heated air constantly circulated in said section, and the moisture laden air discharged from the apparatus by way of the stack 50.

Sufficient spray nozzles are directed toward the baffle troughs in the several 10—12 sections to absorb most of the heat from the combustion gases expelled through the stacks 28 of the heating coils 26. The heat not absorbed by evaporation of the liquid from the surface of the troughs permeates the liquid cascading through the V notches in said troughs, whereby the gases are further reduced in temperature and additional heat thus absorbed by the liquid. The balance of the heat above a definite degree present in the gases is thoroughly scrubbed as it passes through the spray nozzles, said gases thereby giving up all of the heat above the temperature of the liquid being sprayed. The overall heat efficiency of the apparatus is also enhanced by reason of the manner in which exhausting of the combustion products is accomplished in accordance with my invention. As will be seen, room air is picked up right at the vestibuled entrant and exit ends of the washer proper in moderate quantities, i. e., only sufficient to carry along the products of combustion which, of necessity, must be expelled from the apparatus. In this way, the amount of room air entering the apparatus is kept at a minimum with consequent prevention of exhaust of large amounts of hot air from the apparatus. The necessity for keeping outside air from entering the washer housing within appreciable distances is of the utmost importance because, if this should take place, the air would be heated from room temperature to the temperature of the solution being sprayed, thereby becoming partly or completely saturated and, when exhausted, carrying away with it great quantities of the total heat. Such contingency is entirely obviated by my improved construction.

It is to be understood that I do not consider myself limited to the precise details of construction and arrangement herein shown by way of example since, as will be readily understood by those skilled in the washing art, considerable variation is possible within the scope of the appended claims.

Having thus described my invention, I claim:

1. In washing apparatus of the character described, a tunnel housing through which work to be cleaned is passed; an open top sump at the bottom of the housing for wash liquid; a gas fired heating coil submerged in the sump and terminating in an upright stack which extends slightly above the liquid level in the sump; pipes, with spray nozzles at different elevations, arranged along opposite sides of the tunnel; pump means for continually drawing liquid from the sump for discharge from the nozzles upon the work as it is progressed through the housing, a baffle arranged transversely of the tunnel immediately above the top of the stack of the heating coil whereby the combustion gases are laterally diffused within the tunnel for absorption of heat therefrom by the liquid being sprayed, said baffle being in the form of a catch trough for temporarily retaining and heating the trapped spray liquid and from which the collected liquid continually overflows into the sump for re-use in the washing operation.

2. Washing apparatus according to claim 1, wherein vestibules devoid of spray pipes are provided respectively at the entrant and exit ends of the housing, and further including flues which lead from the respective vestibules at the top; and suction blower means interposed in the respective flues.

3. Washing apparatus according to claim 1, further including a drying chamber in continuation of the tunnel housing; and pressure blower means for circulating air transversely within the drying chamber.

4. Washing apparatus according to claim 1, further including a drying chamber in continuation with the tunnel housing; pressure blower means for circulating air transversely within the drying chamber; and means for heating the air before discharge into the drying chamber.

5. Washing apparatus according to claim 1, further including a drying chamber in continuation of the tunnel housing; pressure blower means for circulating air transversely within the drying chamber; and an exhaust flue leading from the top of the drying chamber at one end thereof.

6. In washing apparatus of the character described, a tunnel housing comprising aligned multiple sections through which work to be cleaned is passed; an open top sump for wash liquid at the bottom of each section; a gas fired heating coil submerged in the liquid in each sump and terminating in an upright stack which extends slightly above the liquid level in the sump; pipes with spray nozzles at different elevations, arranged along opposite sides of each section; pump means for continually drawing wash liquid from each sump for discharge from the nozzles in the pipes of the corresponding section upon the work progressed through the housing; and a baffle arranged transversely of the tunnel immediately above the top of the stack of the heating coil within the sump of each section whereby the combustion gases are laterally diffused within the tunnel for absorption of heat therefrom by the liquid being sprayed, said baffle being in the fom of a catch trough for temporarily retaining and heating some of the spray liquid and from which the trapped liquid continually overflows into such sump for re-use in the washing.

7. Washing apparatus according to claim 6, wherein vestibules devoid of spray pipes are provided respectively at the entrant end of the first section of the housing and at the exit end of the last section as considered with respect to the direction of progression of the work through apparatus, and further including flues which lead from the respective vestibules at the top; and suction blower means interposed in the respective flues.

8. Washing apparatus according to claim 6, wherein clear spaces devoid of spray pipes are provided between contiguous sections to permit draining of wash liquid from the work as it passes from one section into the next.

9. Washing apparatus according to claim 6, further including an aligned drying section through which the work is passed after leaving the last spray section and before exit from the apparatus; and pressure blower means for circulating air transversely within the drying section.

10. Washing apparatus according to claim 6, further including an aligned drying section through which the work is passed after leaving the last spray section and before exit from the apparatus; pressure blower means for circulating air transversely within the drying section; and means for heating the air before discharge into the drying section.

11. Washing apparatus according to claim 6, further including the aligned drying section through which the work is passed after leaving the last spray section and before exit from the apparatus; pressure blower means for circulating air transversely within the drying section; and an exhaust flue leading from the top of the drying section at one end thereof.

References Cited in the file of this patent

UNITED STATES PATENTS

| | | |
|---|---|---|
| 1,469,625 | Dodge | Oct. 2, 1923 |
| 1,512,918 | Forsgard | Oct. 28, 1924 |
| 1,624,982 | Rosenberg | Apr. 19, 1927 |
| 1,692,812 | Blakeslee | Nov. 27, 1928 |
| 1,896,149 | Zademach | Feb. 7, 1933 |
| 2,259,278 | Theiss | Oct. 14, 1941 |
| 2,387,944 | Raymond | Oct. 30, 1945 |